United States Patent [19]

Van Erk et al.

[11] 4,174,490
[45] Nov. 13, 1979

[54] CATHODE-RAY TUBE

[75] Inventors: Klaus C. Van Erk; Marinus Ploeger; Peter H. Von Reth, all of Eindhoven, Netherlands

[73] Assignee: U.S. Philips Corporation, New York, N.Y.

[21] Appl. No.: 907,553

[22] Filed: May 19, 1978

[30] Foreign Application Priority Data

May 25, 1977 [NL] Netherlands ............... 7705731

[51] Int. Cl.² ............ H01J 31/20; C03C 3/10; C03C 3/30
[52] U.S. Cl. ............... 313/480; 106/53; 252/478
[58] Field of Search ............ 106/53; 313/480; 252/478

[56] References Cited

U.S. PATENT DOCUMENTS

| 3,464,932 | 9/1969 | Connelly et al. | 106/53 |
|---|---|---|---|
| 3,663,246 | 5/1972 | LaGrouw | 106/53 |
| 3,794,502 | 2/1974 | LaGrouw | 106/53 |
| 3,819,972 | 6/1974 | Sanner | 106/53 |
| 3,907,584 | 9/1975 | Wade et al. | 106/53 |
| 3,925,089 | 12/1975 | Houben | 106/53 |
| 3,987,330 | 10/1976 | Shell | 106/53 |
| 4,065,696 | 12/1977 | Steierman | 313/480 |
| 4,065,697 | 12/1977 | Steierman | 313/480 |

FOREIGN PATENT DOCUMENTS 5087405  7/1975  Japan .................. 313/480

*Primary Examiner*—O. R. Vertiz
*Assistant Examiner*—Mark Bell
*Attorney, Agent, or Firm*—Algy Tamoshunas

[57] ABSTRACT

Disclosed is a cathode-ray tube having a face plate of soft glass which up to an accelerating voltage of 40 KV gives an X-ray emission of at most 0.5 mr/h measured at a distance of 5 cm. The glass has a strain point between 450° and 480° C. and a softening temperature between 660° and 770° C. and comprises, inter alia, 3–14% by weight of BaO and 5–10% by weight of PbO.

2 Claims, No Drawings

CATHODE-RAY TUBE

The invention relates to a cathode-ray tube for displaying television pictures in colour comprising an evacuated glass envelope with one or several electron guns positioned therein and a face plate with a fluorescent layer comprising a pattern of phosphor regions disposed opposite the electron guns.

The invention, in particular, relates to a face plate for such a tube and to a glass composition for the face-plate.

The envelope of such display tubes is composed of three glass parts, namely the neck, the cone and the face plate, which may consist of different types of glass which, however, are physically matched to each other. British Patent application 76/13,864 discloses one type of glass suitable for the face-plate and the cone of such a cathode-ray tube for displaying black-and-white pictures which is also suitable for the face-plate of a colour cathode-ray tube. The glass which contains no lithium oxide is characterized by a composition in % by weight between the following limits:

| | | | |
|---|---|---|---|
| $SiO_2$ | 62–69 | Sr | 0–2 |
| $Na_2O + K_2O$ | 14–17 | PbO | 0–5 |
| $1.4 < Na_2O/K_2O <$ | 2.2 | $ZrO_2 + Al_2O_3$ | 2–6 |
| BaO | 9–14 | $Sb_2O + As_2O_3$ | 0–0.8 |

These glasses have the following physical properties: an annealing point ($\eta = 10^{14.6}$ poises) of approximately 430°–450° C.; a strain point ($\eta = 10^{13.5}$ poises) of approximately 450°–480° C.; a softening temperature ($\eta = 10^{7.6}$ poises) of 660°–700° C. and a working temperature ($\eta = 10^4$ poises) of 990°–1040° C. The values for the strain point and the annealing point are 20° to 40° C. lower than it was heretofore believed necessary to make a colour cathode-ray tube and to evacuate the envelope without unacceptable deformation. A consequence of this is that the softer glass can be polished much more rapidly, since the shear mark is less deep.

In addition, there are a few requirements which have to be fulfilled, namely the difference between the softening temperature and the high strain point must be at least 190° C. and the difference between the working temperature and the softening temperature, the so-called "warm length" should be at least 300° C.

Then there is also a requirement with respect to the permeability of X-rays, namely a screen glass having a thickness of at least 11 mm and an accelerating voltage of 27.5 kV on the electron gun and an anode current of $3 \times 100$ μA may have an X-ray transmission which, measured at a distance of 5 cm from the face-plate, is at most 0.5 millirontgen per hour.

For circuits of a certain type in some devices with colour cathode-ray tubes a larger margin is necessary for the accelerating voltage in order to fulfil the above mentioned criterion under all circumstances, namely 40 kV. However, the above-defined class of glasses no longer satisfies this requirement. It is the object of the invention to provide a class of glasses which does fulfil this requirement and also has the above-mentioned ranges of strain point, softening temperature and working temperature.

A cathode-ray tube according to the invention comprises a glass envelope with a face-plate made from a glass having a strain point between 450° and 480° C., a softening temperature between 660° and 700° C. and a working temperature between 990° and 1040° C. The glass of the face plate has a composition in % by weight characterized by the following limits:

| | | | | |
|---|---|---|---|---|
| $SiO_2$ | 60–68 | | SrO | 0–1 |
| $Al_2O_3$ | 0–6 | | PbO | 5–10 |
| $Na_2O$ | 5–12 | } totally >13 | $ZrO_2$ | 0–3 |
| $K_2O$ | 3–11 | | $CeO_2$ | 0–0.6 |
| CaO | 0–1 | | $Sb_2O + As_2O_3$ | 0.3–0.7 |
| MgO | 0–2 | | F | 0–1.5 |
| BaO | 3–14 | | $TiO_2$ | 0–0.3 |

, with the complementary conditions that
$Al_2O_3 + ZrO_2 > 2$
$BaO + 2SrO + 2ZrO_2 + 3PbO > 28$ and
$3CaO + 2MgO + SrO + 4ZrO_2 < 12$ Glass compositions which satisfy these limits have an X-ray absorption coefficient μ at 0.6 Å $>26^{-1}$ and at 0.31 Å $>5$ cm$^{-1}$, so that they satisfy the above-mentioned criterion.

It is to be noted that a lead oxide-containing glass for envelopes of cathode-ray tubes is known from U.S. Pat. No. 3,663,246 which has a somewhat related composition. However, it comprises more potassium oxide, more calcium oxide, less sodium oxide and is thus considerably harder.

The invention will be described in detail with reference to the following examples.

The glass compositions defined in the following Table were melted in a glass furnace which was heated by natural gas in a weakly oxidizing atmosphere. The starting mixture consisted of sand, potassium telspar, potassium carbonate, sodium carbonate, barium carbonate, minium, antimony oxide and optionally dolomite, magnesium oxide, calcium carbonate and zirconium silicate. The SrO occurring in the glass is to be ascribed to a contamination in the $BaCO_3$.

The physical properties of the resulting glasses are recorded, namely the viscous properties as defined above, the $t_K = 100$, which is the temperature at which the specific resistance of the glass is 100 M Ohm.cm. the Tε, which is the temperature at which the specific resistance of the glass is $10^{6.5}$ Ohm.cm, the value of log ε(ε in Ohm.cm) at the temperatures 250° and 350° C. and the X-ray absorption coefficient μ at 0.6 Å.

Face plates of these glass compositions were pressed and were provided on the inner surface with a pattern of red, green and blue phosphor dots.

The face plates were secured, by means of a devitrifiable vitreous enamel, to a glass cone having the following composition in % by weight

| | | | |
|---|---|---|---|
| $SiO_2$ | 50.3 | MgO | 2.6 |
| $Na_2O$ | 6.0 | PbO | 24.0 |
| $K_2O$ | 9.0 | $Al_2O_3$ | 4.6 |
| CaO | 3.2 | $Sb_2O_3$ | 0.3 | and to a neck portion, in which the electron guns are sealed in, of the following composition in % by weight

| | | | |
|---|---|---|---|
| $SiO_2$ | 49.1 | PbO | 34.6 |
| $Na_2O$ | 1.9 | $Al_2O_3$ | 1.3 |
| $K_2O$ | 10.6 | $Sb_2O_3$ | 0.4 |
| CaO | 2.0 | MnO | 0.1 |

After sealing together, the tube was heated to a temperature of approximately 450° C. and evacuated.

|  | 1 | 2 | 3 | 4 | 5 | 6 | 7 | 8 | 9 |
|---|---|---|---|---|---|---|---|---|---|
| $SiO_2$ | 64.1 | 63.5 | 63.8 | 65.7 | 63.1 | 64.0 | 63.1 | 60.7 | 64.7 |
| $Na_2O$ | 5.9 | 7.0 | 5.1 | 8.4 | 6.3 | 10.4 | 5.9 | 7.3 | 10.2 |
| $K_2O$ | 9.7 | 7.5 | 10.6 | 7.9 | 8.4 | 3.4 | 9.5 | 7.2 | 4.6 |
| $MgO$ |  |  |  |  |  |  | 0.6 | 1.8 | — |
| $CaO$ |  |  |  |  |  |  | 0.8 | — | 0.8 |
| $BaO$ | 11.0 | 13.7 | 11.4 | 9.1 | 14.1 | 12.3 | 10.9 | 14.2 | 5.2 |
| $SrO$ | 0.2 | 0.2 | 0.2 | 0.1 | 0.2 | 0.3 | 0.2 | 0.3 | 0.1 |
| $ZrO$ |  |  |  | 2.7 | — | — | — | — | — |
| $PbO$ | 6.2 | 5.2 | 6.0 | 5.1 | 5.0 | 6.0 | 6.1 | 5.0 | 9.5 |
| $Al_2O_3$ | 2.1 | 2.1 | 2.1 | 0.2 | 2.1 | 3.6 | 2.1 | 2.7 | 3.7 |
| $SB_2O_3$ | 0.6 | 0.6 | 0.6 | 0.6 | 0.6 | — | 0.6 | 0.6 | 0.6 |
| $CeO_2$ | 0.2 | 0.2 | 0.2 | 0.2 | 0.2 | — | 0.2 | 0.2 | 0.6 |
| Annealing point (°C.) | 435° | 435° | 444° | 435° | 349° | 438° | 446° | 448° | 432° |
| Strain point (°C.) | 464 | 464 | 472 | 464 | 477 | 466 | 475 | 476 | 460 |
| Softening temp. (°C.) | 669 | 669 | 675 | 669 | 682 | 666 | 679 | 677 | 661 |
| Working temp. (°C.) | 1019 | 1013 | 1029 | 1026 | 1021 | 1011 | 1020 | 1006 | 1015 |
| $t\rho$ (°C.) | 405 | 397 | 413 | 368 | 401 | 331 | 409 | 396 | 334 |
| $t_{K100}$ (°C.) | 311 | 304 | 318 | 280 | 308 | 245 | 313 | 303 | 251 |
| log 250° $\rho$ | 9.25 | 9.12 | 9.41 | 8.59 | 9.20 | 7.91 | 9.17 | 8.99 | 7.60 |
| log 350° $\rho$ | 7.46 | 7.21 | 7.46 | 6.78 | 7.27 | 6.25 | 7.33 | 7.16 | 6.27 |
| $\mu$ 0.6 A (cm$^{-1}$) | 28.7 | 28.5 | 28.8 | 28.3 | 28.6 | 28.0 | 28.9 | 28.8 | 31.2 |

What is claimed is:

1. In a colour television cathode ray tube included an evacuated glass envelope having a glass face plate, a fluorescent layer having a pattern of phosphor regions on the inner surface thereof, and at least one electron gun disposed in said envelope opposite said face plate, the improvement wherein said glass of said face plate consists essentially of, in percent by weight:

| $SiO_2$ | 60–68 |  | $SrO$ | 0–1 |
|---|---|---|---|---|
| $Al_2O_3$ | 0–6 |  | $PbO$ | 5–10 |
| $Na_2O$ | 5–12 | combined | $ZrO_2$ | 0–3 |
| $K_2O$ | 3–11 | >13 | $CeO_2$ | 0–0.6 |
| $CaO$ | 0–1 |  | $Sb_2O_3 + As_2O_3$ | 0.3–0.7 |
| $MgO$ | 0–2 |  | F | 0–1.5 |
| $BaO$ | 3–14 |  | $TiO_2$ | 0–0.3 | with the complementary conditions that $Al_2O_3 + ZrO_2 > 2$
$BaO + 2SrO + 2ZrO_2 + 3PbO > 28$ and
$3CaO + 2MgO + SrO + 4ZrO_2 < 12$ 2. A glass composition for a face plate of a cathode ray tube consisting essentially of, in percent by weight:

| $SiO_2$ | 60–68 |  | $SrO$ | 0–1 |
|---|---|---|---|---|
| $Al_2O_3$ | 0–6 |  | $PbO$ | 5–10 |
| $Na_2O$ | 5–12 | combined | $ZrO_2$ | 0–3 |
| $K_2O$ | 3–11 | >13 | $CeO_2$ | 0–0.6 |
| $CaO$ | 0–1 |  | $Sb_2O_3 + As_2O_3$ | 0.3–0.7 |
| $MgO$ | 0–2 |  | F | 0–1.5 |
| $BaO$ | 3–14 |  | $TiO_2$ | 0–0.3 | with the complementary conditions that $Al_2O_3 + ZrO_2 > 2$
$BaO + 2SrO + 2ZrO_2 + 3PbO > 28$ and
$3CaO + 2MgO + SrO + 4ZrO_2 < 12$

* * * * *